United States Patent
Kubo et al.

(10) Patent No.: US 6,822,686 B1
(45) Date of Patent: Nov. 23, 2004

(54) LENS CONTROL APPARATUS

(75) Inventors: Kenichi Kubo, Utsunomiya (JP); Akira Hiraoka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/102,238

(22) Filed: Jun. 22, 1998

(30) Foreign Application Priority Data

Jun. 27, 1997 (JP) .............................................. 9-187379

(51) Int. Cl.[7] ........................ G03B 17/00; G03B 13/22; G03B 3/10; G03B 3/00; H04N 5/232
(52) U.S. Cl. ....................... 348/347; 348/357; 396/86; 396/135; 396/93
(58) Field of Search ................................ 348/345, 347, 348/357, 358, 363; 396/120, 131, 133, 93, 103, 86, 135

(56) References Cited

U.S. PATENT DOCUMENTS

| | | | | |
|---|---|---|---|---|
| 4,735,494 A | * | 4/1988 | Makino et al. ............. | 348/347 |
| 4,841,325 A | * | 6/1989 | Hoshino et al. ............. | 396/75 |
| 4,896,179 A | | 1/1990 | Watanabe et al. ......... | 354/195.1 |
| 4,903,134 A | * | 2/1990 | Murashima et al. ........ | 348/347 |
| 5,278,601 A | | 1/1994 | Kawanami ................... | 354/400 |
| 5,408,332 A | * | 4/1995 | Murakami et al. .......... | 348/345 |
| 5,493,357 A | * | 2/1996 | Hara et al. ................... | 396/85 |
| 5,633,680 A | * | 5/1997 | Kaneko et al. ............. | 348/357 |
| 5,648,836 A | * | 7/1997 | Sato et al. ................... | 348/345 |
| 5,699,116 A | * | 12/1997 | Yamazaki et al. .......... | 348/347 |
| 5,703,638 A | * | 12/1997 | Ohta et al. ................... | 348/345 |
| 5,832,318 A | * | 11/1998 | Sato et al. ................... | 348/345 |
| 6,130,715 A | * | 10/2000 | Matsui et al. ............... | 348/345 |
| 6,169,578 B1 | * | 1/2001 | Chigira ........................ | 348/347 |
| 2001/0055481 A1 | * | 12/2001 | Yoshikawa et al. ........... | 396/89 |

FOREIGN PATENT DOCUMENTS

| | | | | |
|---|---|---|---|---|
| EP | 0 334 003 | | 9/1989 | |
| EP | 0334003 A1 | * | 9/1989 | ............ G03B/3/10 |
| JP | 05045566 A | * | 2/1993 | ............ G02B/7/10 |
| JP | 0802369 A | * | 1/1996 | .......... H04N/5/232 |

* cited by examiner

Primary Examiner—Tuan Ho
Assistant Examiner—John M Villecco
(74) Attorney, Agent, or Firm—Cowan, Liebowitz & Latman, P.C.

(57) ABSTRACT

A lens control apparatus for controlling the position of a focusing lens includes a rotary operation member, a detector, having a rotary encoder coupled with the rotary operation member, which detects the amount of rotation per unit time of the rotary operation member by counting the number of pulses per unit time outputted from the rotary encoder, and a conversion circuit for converting a detection output of the detector into a signal indicative of the position of the focusing lens. Further, the lens control apparatus is provided with a control characteristic changing circuit for changing a control characteristic of the lens.

4 Claims, 18 Drawing Sheets

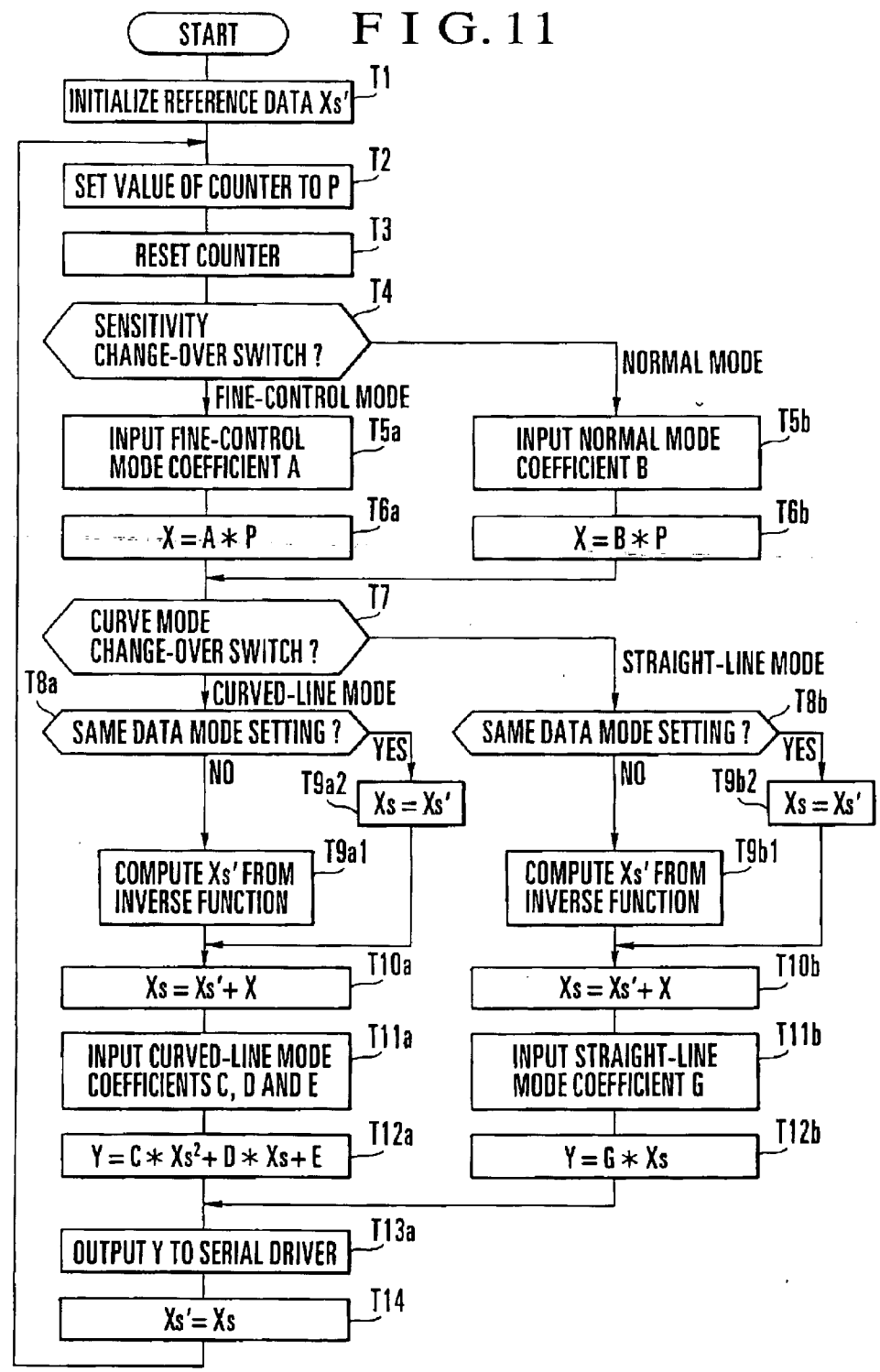
F I G. 11

LENS CONTROL APPARATUS

BACKGROUND OF THE INVENTION

1. Field of the Invention

The present invention relates to a lens control apparatus of a television camera for servo-controlling the position of a focusing lens in accordance with the rotational angle of a rotary handle which is manually operable.

2. Description of Related Art (1) In television cameras and so on, there have been known lens control apparatuses for servo-controlling the position of a focusing lens for a particular object distance in accordance with an absolute position which is a rotational angle from the mechanical end of a rotary handle. The absolute position of the rotary handle is detected by means of a potentiometer. Further, the lens control apparatus is provided with a sensitivity change-over switch for changing the sensitivity of a focusing-lens control voltage relative to the rotational angle of the rotary handle, and a curve mode change-over switch for changing the relationship between the absolute position of the rotary handle and the focusing-lens control voltage. These switches are disposed at arbitrary positions of the lens control apparatus.

When the sensitivity change-over switch is turned on, the sensitivity of the focusing-lens control voltage relative to the rotational angle of the rotary handle within a prescribed angular range from the absolute position thereof obtained at that time is changed, and, further, when the curve mode change-over switch is switched, the relationship between the absolute position of the rotary handle and the focusing-lens control voltage is changed, so that the position of the focusing lens can be controlled.

(2) There have been known lens control apparatuses for servo-controlling the position of a focusing lens for a particular object distance in accordance with the rotational angle of the rotary handle.

FIG. 20 is a sectional view of a conventional lens control apparatus, and FIG. 21 is a sectional view taken along the line X—X of FIG. 20. In FIG. 20, a rotary handle 3 is attached to a main body 1 through a bearing 2, and a potentiometer 4 is coupled with the rotating shaft 3a of the rotary handle 3. In addition, a sensitivity change-over switch 5, an LED 6 and a cable connector 7 are disposed at arbitrary positions of the main body 1.

An Archimedean spiral groove 1a as shown in FIG. 21 is formed to the side of the main body 1 which is near to the rotary handle 3 in order to restrict the rotational range of the rotary handle 3. Further, a linear groove 3b is formed in a radial direction to the side of the rotary handle 3 which confronts the spiral groove 1a. A ball 1b is accommodated between the spiral groove 1a and the linear groove 3b. The abutment of the ball 1b against both ends 1c of the spiral groove 1a restricts the maximum number of rotations of the rotary handle 3 to one to three times.

The main body 1 detects the rotational angle of the rotary handle 3 by means of the potentiometer 4 which recognizes it through the rotating shaft 3a of the rotary handle 3. When the sensitivity change-over switch 5 is turned on in this instance, the relationship between the rotational angle θ of the rotary handle 3 and the output voltage V of the potentiometer 4 is changed from a normal mode to a fine-control mode, as shown in FIG. 22. As a result, the sensitivity of the focusing-lens control voltage relative to the rotational angle of the rotary handle 3 is changed within a certain angle range "θn±a" about the rotational angle position θn of the rotary handle 3 obtained when the sensitivity change-over switch 5 is turned on. With this operation, the position of the focusing lens can be servo-controlled non-linearly.

(i) However, since the maximum number of rotations (maximum rotational angle θ) of the rotary handle 3 is predetermined in the lens control apparatus of the above-mentioned prior art (1), the focusing-lens control voltages V in all the modes must be made identical at each of a starting end and a terminating end of the entire rotating range of the rotary handle 3, as shown in FIG. 23. Accordingly, there is a problem that when the sensitivity of the focusing-lens control voltage is changed from the normal mode to the fine-control mode at a rotational angle θ1 during process of operation of the focusing lens and, after an optimum position of the focusing lens is obtained at a rotational angle θ2, the normal mode is resumed, the focusing-lens control voltage V changes from a value Pf to a value Pn, so that the position of the focusing lens will be shifted.

Further, since the focusing-lens control voltage V is determined on the basis of the absolute position of the rotary handle 3, there is a problem that when the curve mode change-over switch is switched from a straight-line mode to a curved-line mode, the focusing-lens control voltage V changes from a value Pb to a value Pa, as shown in FIG. 24, so that the position of the focusing lens will be shifted.

(ii) Since the maximum number of rotations of the rotary handle 3 is predetermined also in the lens control apparatus of the above-mentioned prior art (2), focusing-lens control voltages Vo at a starting end of the rotary handle 3 in all the modes or focusing-lens control voltages Ve at a terminating end of the rotary handle 3 in all the modes must be made always identical, as shown in FIG. 22. Therefore, the lens control apparatus has a problem that when the sensitivity of the focusing-lens control voltage is switched from the normal mode to the fine-control mode at the rotational angle position θn during process of operation of the focusing lens and, after an optimum position of the focusing lens is obtained at the rotational angle "θn+a", the normal mode is resumed, the focusing-lens control voltage changes from a value Vb to a value Va, so that the position of the focusing lens will be shifted.

BRIEF SUMMARY OF THE INVENTION

An object of the present invention is to solve the above problem (i) and provide a lens control apparatus in which, even if the mode of the sensitivity of a focusing-lens control voltage relative to the rotational angle of a rotary handle is changed over, the focusing-lens control voltage is not varied and, hence, the position of a focusing lens is not shifted.

Another object of the present invention is to solve the above problem (ii) and provide a lens control apparatus in which, even if the mode of the sensitivity of a focusing-lens control voltage relative to the rotational angle of a rotary handle is changed over, the position of a focusing lens is not shifted, and the sensitivity of the focusing-lens control voltage can be obtained in two types of modes.

To attain the above objects, in accordance with an aspect of the present invention, there is provided a focusing lens control apparatus, which comprises a rotary operation member, a measuring circuit, having a rotary encoder coupled with the rotary operation member, which counts number of pulses per unit time outputted from the rotary encoder, and a conversion circuit which converts a measurement output of the measuring circuit into a position signal indicative of a position of a focusing lens, wherein the position of the focusing lens is controlled on the basis of the position signal outputted from the conversion circuit.

Further, to attain the above objects, in accordance with another aspect of the present invention, there is provided a lens control apparatus, which comprises a rotary operation member, state detecting means for detecting a rotating state of the rotary operation member, a conversion circuit which converts a detection signal provided by the state detecting means into a position signal indicative of a position of a lens, the lens being driven on the basis of the position signal outputted from the conversion circuit, and conversion characteristic changing means for changing a conversion characteristic of the conversion circuit.

These and further objects and features of the present invention will become apparent from the following detailed description of preferred embodiments thereof taken in conjunction with the accompanying drawings.

BRIEF DESCRIPTION OF THE SEVERAL VIEWS OF THE DRAWING

FIG. 11 is a flowchart of the calculation sequence in a fourth embodiment of the present invention.

DETAILED DESCRIPTION OF THE INVENTION

Hereinafter, preferred embodiments of the present invention will be described in detail with reference to the drawings.

Figure 1:
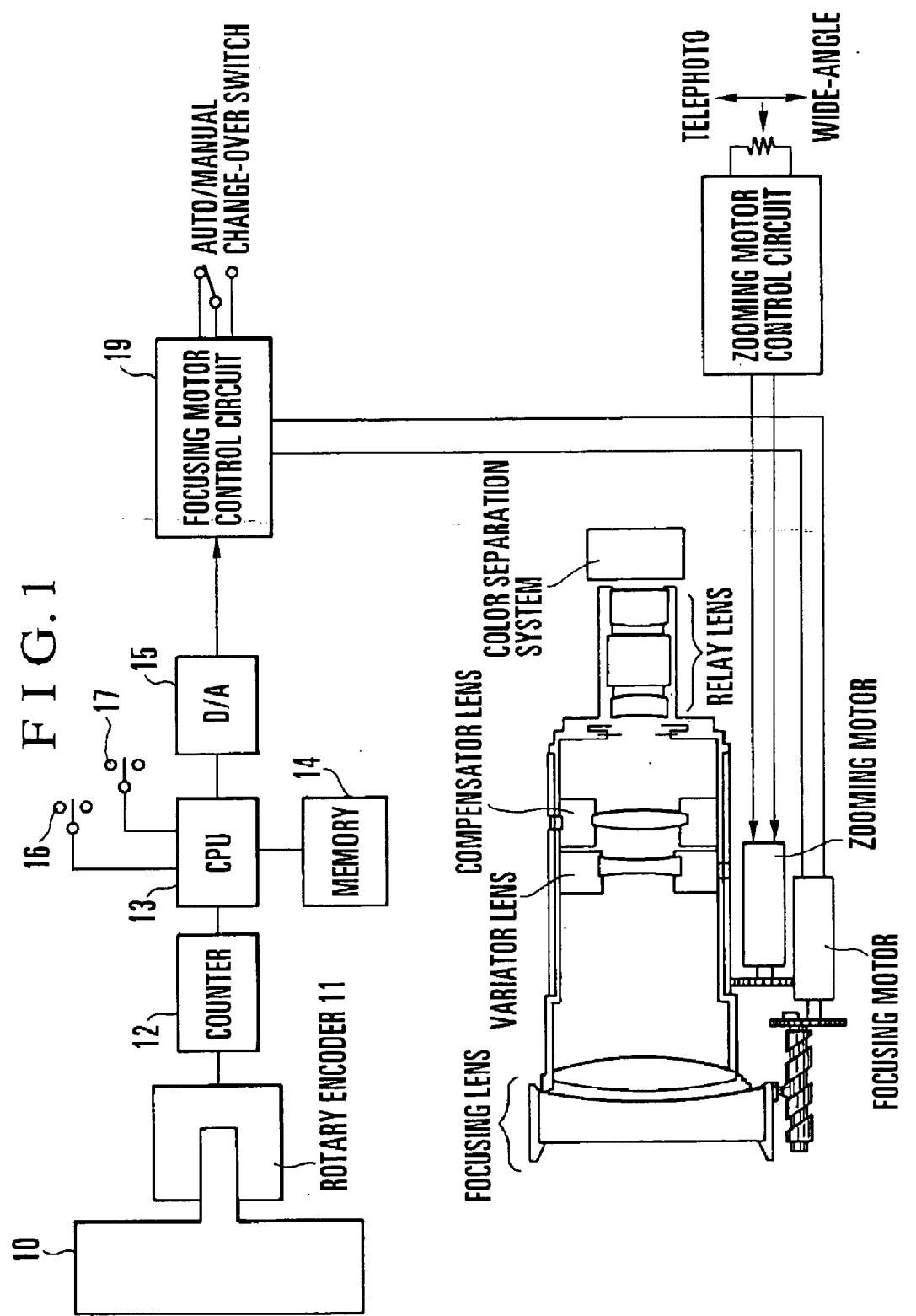
FIG. 1 is a view showing the arrangement of a lens control apparatus according to a first embodiment of the present invention.

FIG. 1 is a view showing the arrangement of an endless focusing lens control apparatus according to a first embodiment of the present invention. In FIG. 1, a rotary encoder 11, which is mounted on a rotary handle 10 provided for operating a focusing lens, is arranged to detect the rotational angle of the rotary handle 10 and output pulses proportional to the rotational angle. The output of the rotary encoder 11 is supplied to a counter 12 for counting the pulses and, then, to a CPU 13 for calculating focusing-lens control data. The CPU 13 is connected to a memory 14 for storing calculation coefficients and initial data to be used in the calculation of the focusing-lens control data, and to a D/A converter 15 for digital-to-analog converting the focusing-lens control data outputted from the CPU 13 into a focusing-lens control voltage and supplying the focusing-lens control voltage to a focusing motor control circuit 19.

Although the lower portion of FIG. 1 illustrates the arrangement of a well-known zoom lens, the detailed description thereof is omitted here.

Further, connected to the CPU 13, respectively are the output of a sensitivity change-over switch 16 for changing over the sensitivity of the focusing-lens control data relative to the rotational angle of the rotary handle 10, and the output of a curve mode change-over switch 17 for changing over the relationship between the rotational angle of the rotary handle 10 and the amount of variation of the focusing-lens control data.

Figure 2:
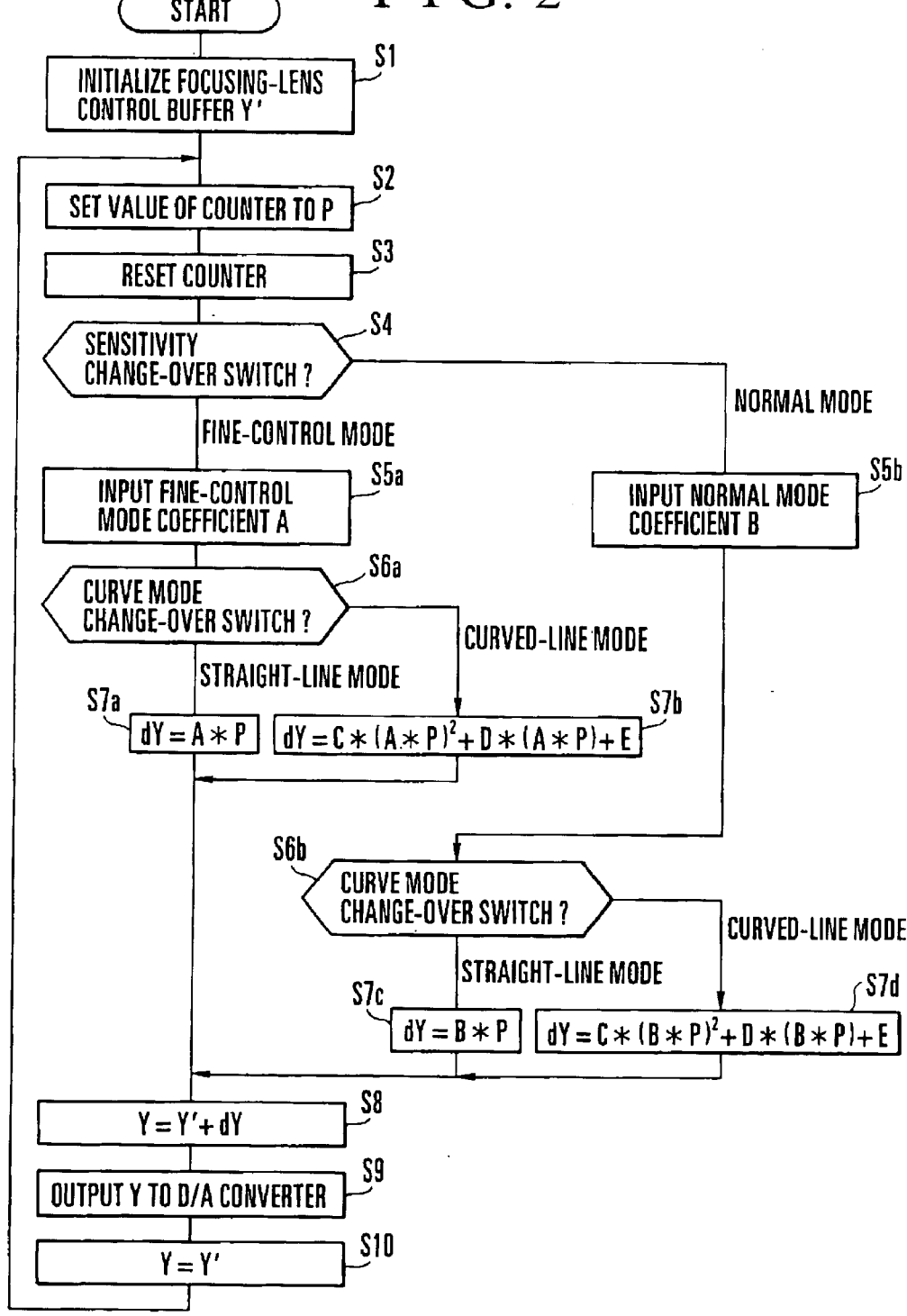
FIG. 2 is a flowchart of the calculation sequence in the first embodiment.

FIG. 2 shows a flowchart of the calculation sequence of the CPU 13. First, after a power supply for the lens control apparatus is turned on, an initial value Xo which can be arbitrarily set is inputted from the memory 14 and, then, is set to a focusing-lens control data buffer Y', at step S1. The number of pulses per unit time which corresponds to the rotational angle of the rotary handle 10 is inputted from the counter 12 and, then, is set to pulse variation data P, at step S2. The counter 12 is cleared at step S3. A state of the sensitivity change-over switch 16 is inputted and determined at step S4.

When the sensitivity change-over switch 16 is in a fine-control mode, a fine-control mode coefficient A is inputted from the memory 14 at step S5a, and a state of the curve mode change-over switch 17 is inputted and determined at step S6a. When the curve mode change-over switch 17 is in a straight-line mode, an amount of variation dY of focusing-lens control data Y is obtained by calculation using the following calculation formula at step S7a. In the calculation formula, "A" represents the fine-control mode coefficient, "P" represents the pulse variation data.

$$dY=A*P$$

When the curve mode change-over switch 17 is in a curved-line mode, the following calculation formula is used at step S7b, wherein "C", "D" and "E" represent constants.

$$dY=C*(A*P)^2+D*(A*P)+E$$

When the sensitivity change-over switch 16 is in a normal mode at step S4, a normal mode coefficient B is inputted from the memory 14 at step S5b, and the state of the curve mode change-over switch 17 is inputted and determined at step S6b. When the curve mode change-over switch 17 is in the straight-line mode, the amount of variation dY of the focusing-lens control data Y is obtained from the following calculation formula at step S7c.

$$dY=B*P$$

On the other hand, when the curve mode change-over switch 17 is in the curved-line mode, the following calculation formula is used at step S7d.

$$dY=C*(B*P)^2+D*(B*P)+E$$

Figure 3:
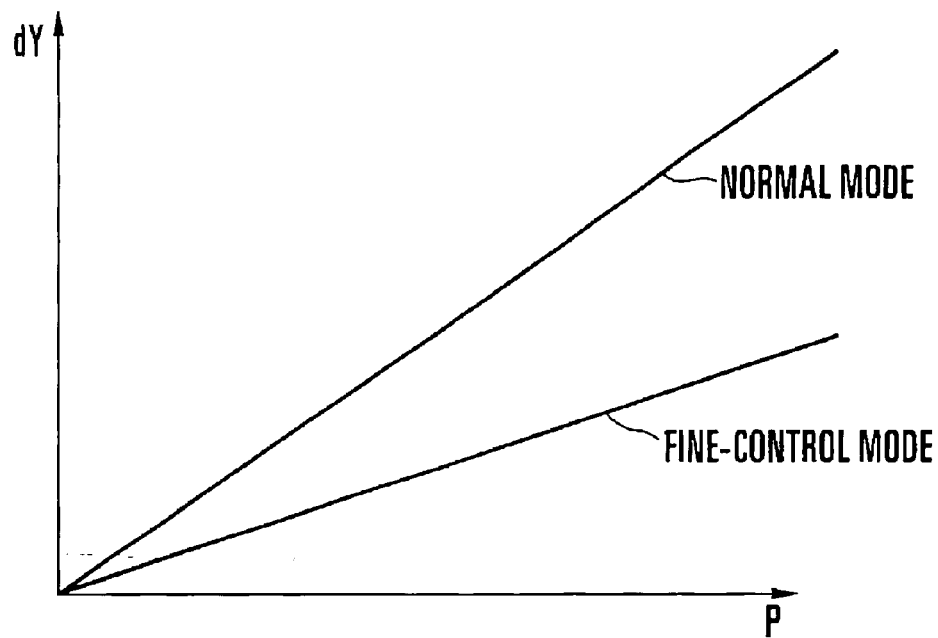
FIG. 3 is a graph showing a relationship between pulse variation data and an amount of variation of focusing-lens control data in the first embodiment.
Figure 4:
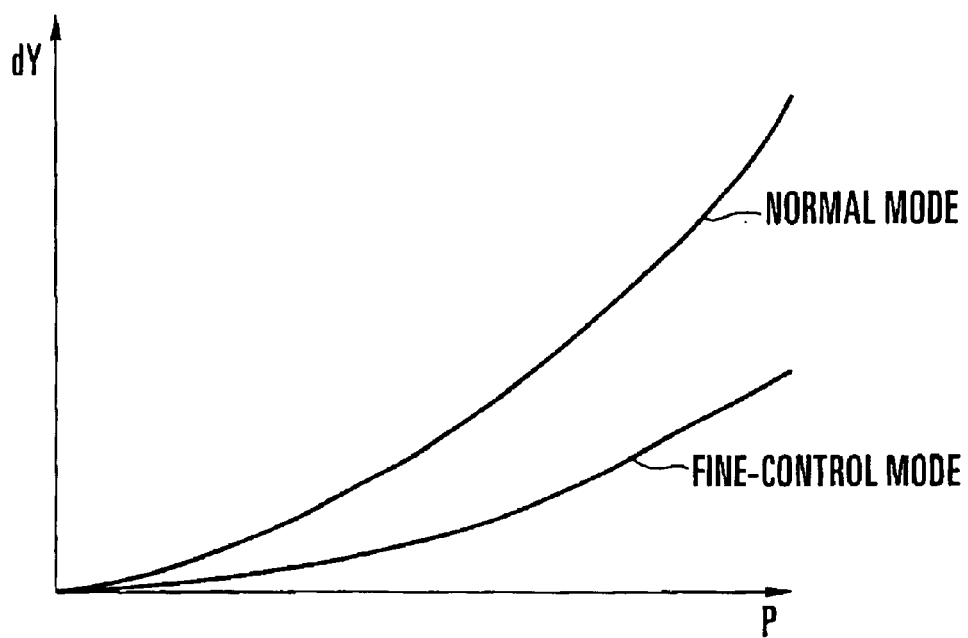
FIG. 4 is a graph showing another relationship between the pulse variation data and the amount of variation of focusing-lens control data in the first embodiment.

FIG. 3 and FIG. 4 are graphs showing the relationships between the pulse variation data P and the amount of variation dY of the focusing-lens control data Y in the straight-line mode and the curved-line mode, respectively.

At step S8, the focusing-lens control data Y is calculated by adding the amount of variation dY determined at step S7a, S7b, S7c or S7d to the focusing-lens control data Y' which was outputted to the D/A converter 15 in the previous sampling. At step S9, the focusing-lens control data Y is outputted to the D/A converter 15 to thereby control the focusing lens. The focusing lens control data Y corresponds to a position signal indicative of the position of the focusing lens. At step S10, the focusing-lens control data Y is transferred to the focusing-lens control data buffer Y', and after that, step S2 to step S10 are repeated again.

Figure 5:
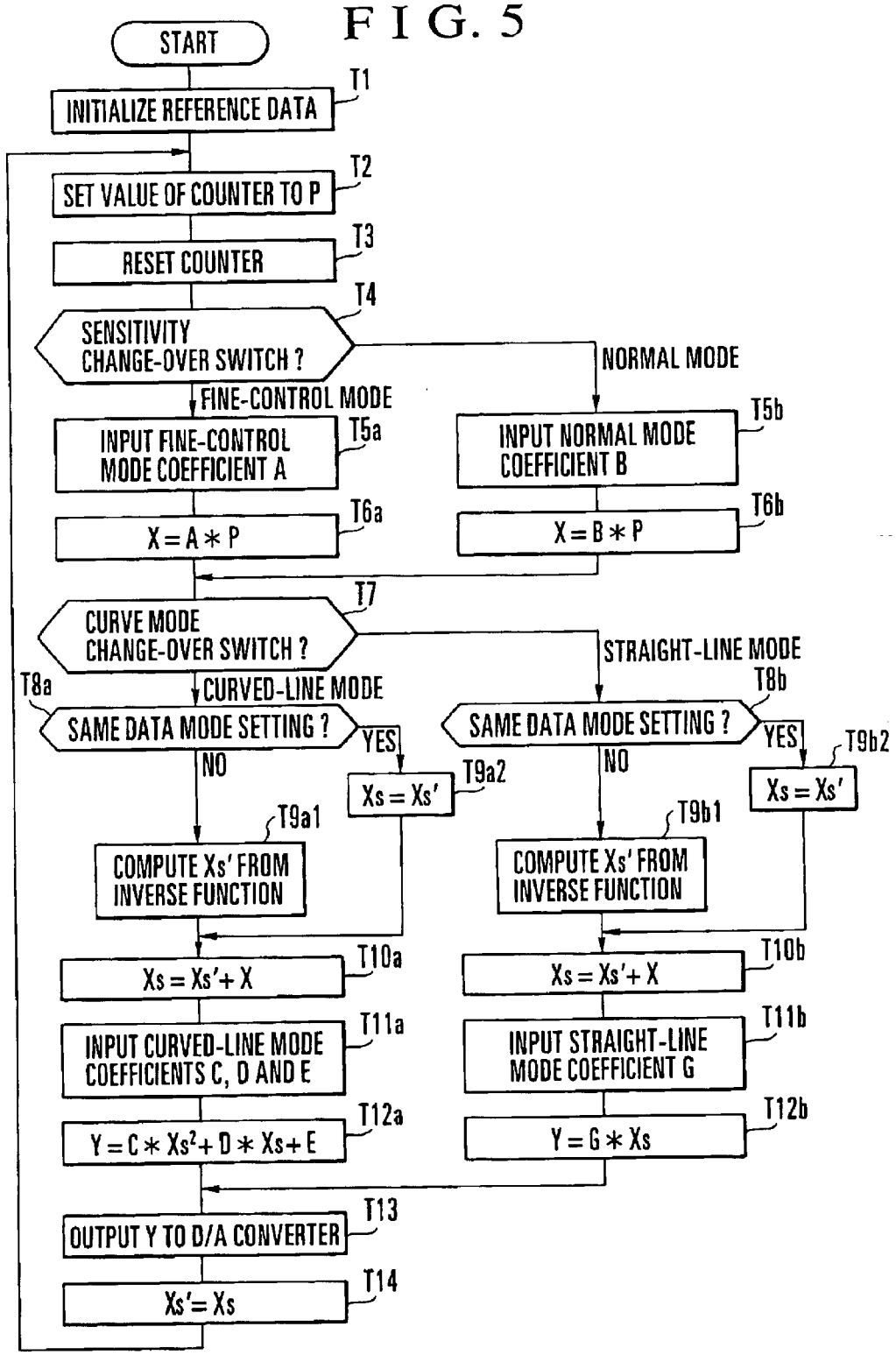
FIG. 5 is a flowchart of the calculation sequence in a second embodiment of the present invention.
Figure 24:
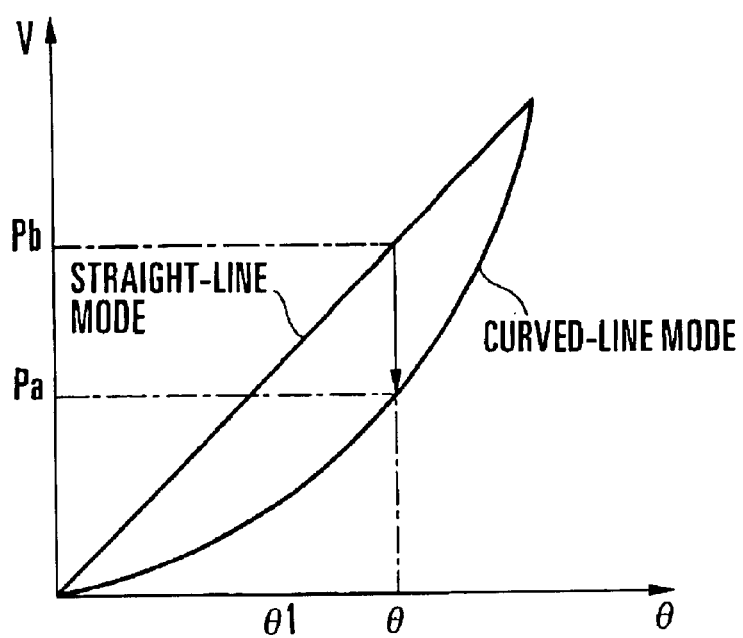
FIG. 24 is a graph showing a further relationship between the rotational angle of the handle and the output voltage.

FIG. 5 shows a flowchart of the calculation sequence of the CPU 13 according to a second embodiment of the present invention. The arrangement of the lens control apparatus according to the second embodiment is the same as that shown in FIG. 1. First, after a power supply for the lens control apparatus is turned on, an initial value Xo which can be arbitrarily set is inputted from the memory 14 and, then, is set to reference data Xs, at step T1. When the curved-line mode shown in FIG. 24 is employed, the reference data Xs is arranged as a curve whose inclination is different depending upon the value of a focusing-lens control voltage. That is, since the relationship between the difference of the rotational angles of the rotary handle 10 and the amount of variation of the focusing-lens control voltage is different depending upon a value of the focusing-lens control voltage, the conversion into the amount of variation of the focusing-lens control voltage cannot be unconditionally executed only by using pulse data corresponding to the difference of the rotational angles of the rotary handle 10. Therefore, the reference data Xs which corresponds to the focusing-lens control voltage in the relationship of 1:1 is introduced in the second embodiment.

The number of pulses corresponding to the rotational angle of the rotary handle 10 is inputted from the counter 12 and, then, is set to pulse variation data P, at step T2. The counter 12 is cleared at step T3. A state of the sensitivity change-over switch 16 is inputted and determined at step T4. When the sensitivity change-over switch 16 is in the fine-control mode, a fine-control mode coefficient A is inputted from the memory 14 at step T5a. Then, the data P inputted from the counter 12 is converted into an amount of variation Xf of the reference data Xs, using the following calculation formula at step T6a.

$$Xf=A*P$$

On the other hand, when the sensitivity change-over switch 16 is in the normal mode at step T4, a normal mode coefficient B is inputted from the memory 14 at step T5b. Then, the pulse variation data P is converted into an amount of variation Xn of the reference data Xs, using the following calculation formula at step T6b.

$$Xn=B*P$$

Figure 6:
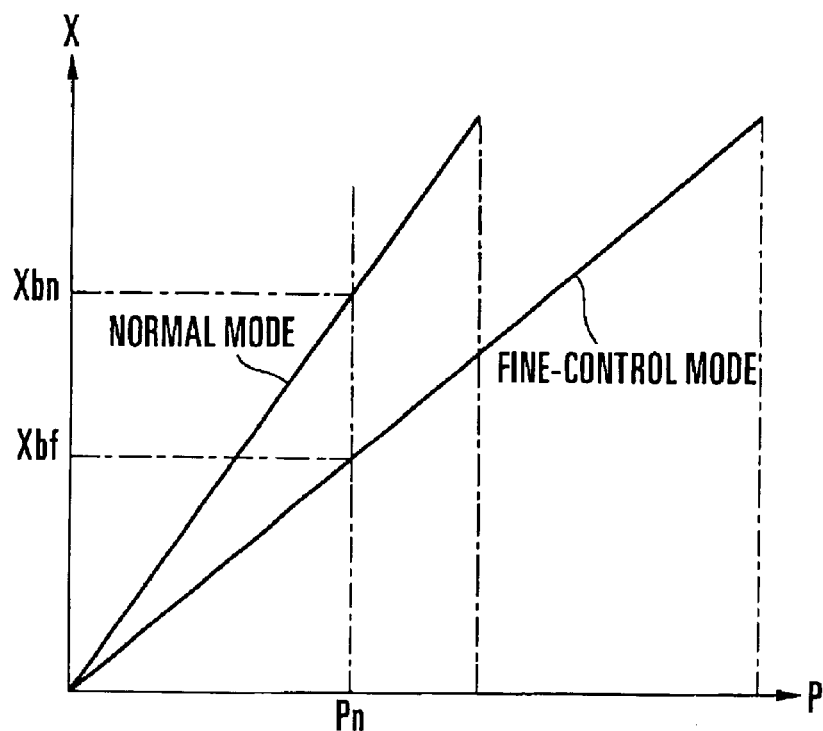
FIG. 6 is a graph showing a relationship between pulse variation data and an amount of variation of reference data in the second embodiment.
Figure 7:
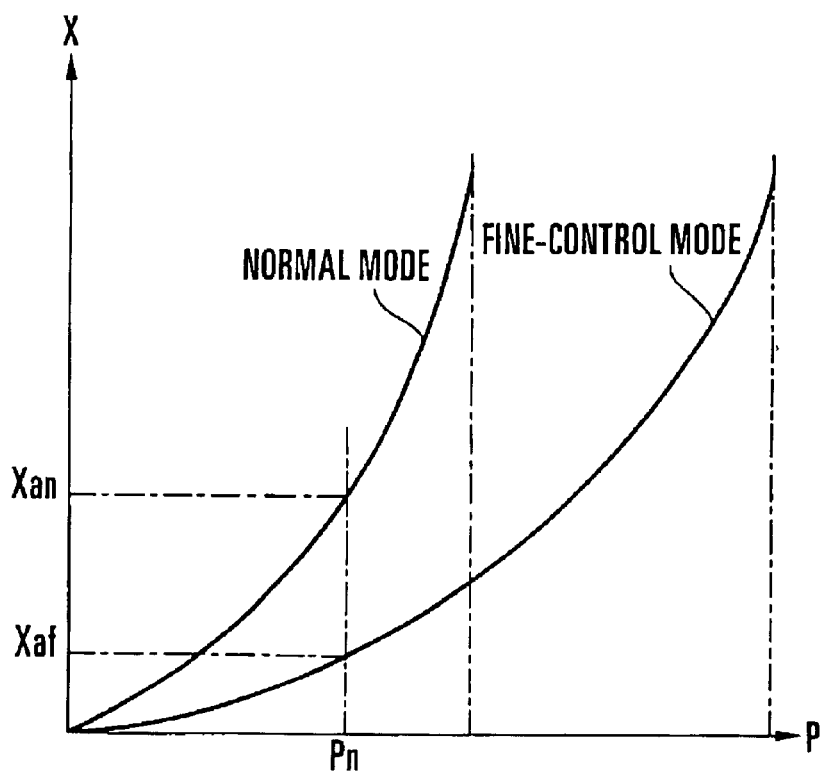
FIG. 7 is a graph showing another relationship between the pulse variation data and the amount of variation of reference data in the second embodiment.

FIG. 6 and FIG. 7 are graphs showing the relationships between the pulse variation data P and the amount of variation X of the reference data in the straight-line mode and the curved-line mode, respectively.

At step T7, a state of the curve mode change-over switch 17 is inputted and determined. When the curve mode change-over switch 17 is in the curved-line mode, the data mode set to the curve mode change-over switch 17 in the previous sampling is compared with the data mode set thereto at this time, at step T8a. When the former data mode is equal to the current data mode, reference data Xs' which was used in the previous sampling is set as the reference data Xs at this time as it is, at step T9a2, as shown in the following formula.

$$Xs=Xs'$$

On the other hand, when the data mode set at this time is different from the data mode set in the previous sampling, that is, when the data mode has been switched from the straight-line mode to the curved-line mode, the reference data Xs' is corrected at step T9a1 using the following calculation formula based on the focusing-lens control data Y which was outputted to the D/A converter 15 in the previous sampling. In the following calculation formula, "$Fa^{-1}(Y)$" is the inverse function of a function "$Fa(X)=C*Xs^2+D*Xs+E$", which is to be used in the curved-line mode.

$$Xs'=Fa^{-1}(Y)$$

At step T10a, the reference data Xs is calculated from the following formula by adding the amount of variation Xaf of the reference data obtained at step T6a in the fine-control mode to the reference data Xs'.

$$Xs=Xs'+Xaf$$

In the normal mode, the reference data Xs is calculated likewise by adding the amount of variation Xan obtained at step T6b to the reference data Xs'.

At step T11a, coefficients C, D and E to be used in the function for the curved-line mode is read out from the memory 14. At step T12a, a focusing-lens control data Y is calculated by substituting the reference data Xs obtained at step T10a into the following function for the curved-line mode.

$$Y=C*Xs^2+D*Xs+E$$

The focusing lens is controlled at step T13 by outputting the focusing-lens control data Y to the D/A converter 15. At step T14, the reference data Xs is transferred to the reference data buffer Xs'. Thereafter, step T2 to step T14 are repeated again.

While the quadratic function is used as the function for the curved-line mode in the second embodiment, any arbitrary function such as a cubic function, an exponential function and so on may be used.

Figure 8:
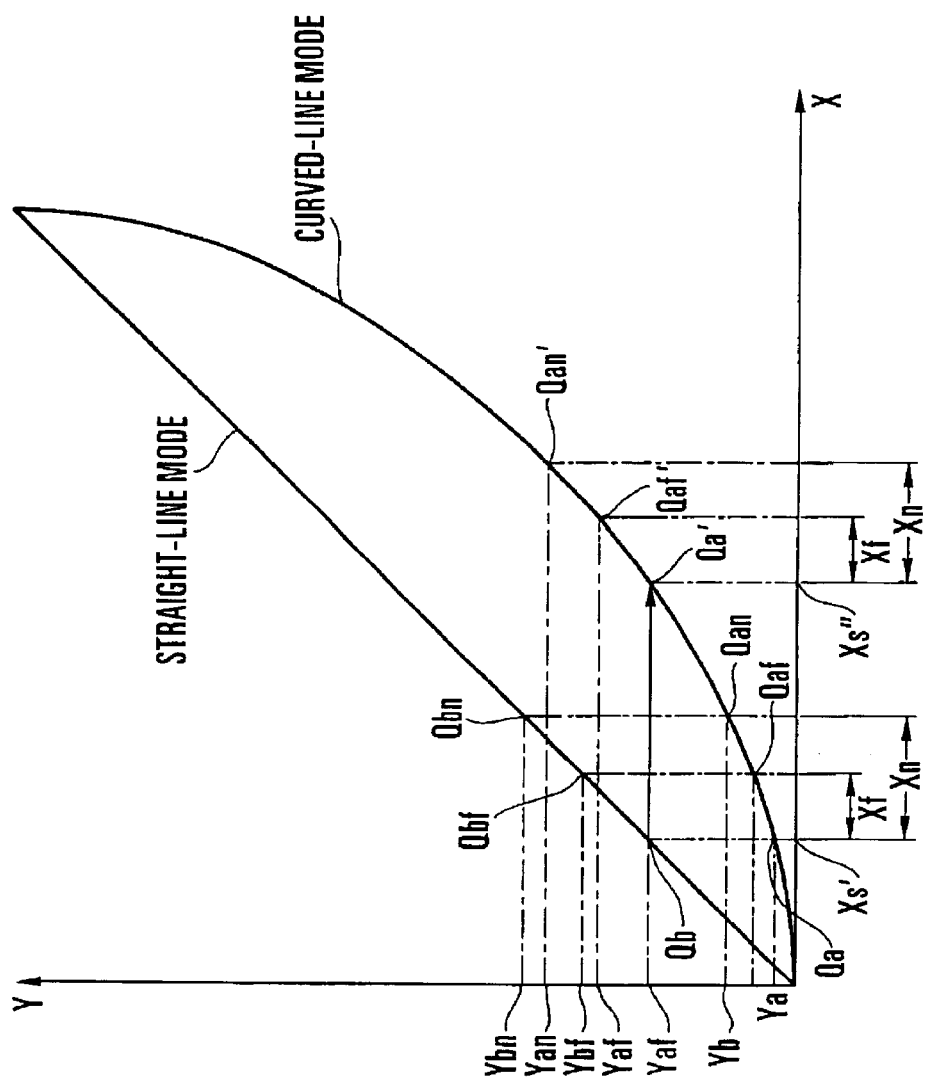
FIG. 8 is a graph showing a relationship between the reference data and focusing-lens control data in the second embodiment.

The processes executed at step T2 to step T12a or T12b will be described with reference to FIG. 8, FIG. 6 and FIG. 7. When the pulse variation data P inputted from the counter 12 at step T2 is Pn (P=Pn), the amount of variation of the reference data is Xaf in the curved-line mode and the fine-control mode, is Xan in the curve-line mode and the normal mode, is Xbf in the straight-line mode and the fine-control mode, and is Xbn in the straight-line mode and the normal mode, at step T5a or T5b and step T6a or T6b, as shown in FIG. 6 and FIG. 7. When the data mode being set is not changed from the data mode in the previous sampling at step T8a or T8b, the reference data Xs is obtained by adding the amount of variation Xaf, Xan, Xbf or Xbn in the respective modes to the reference data Xs' obtained in the previous sampling. For example, the reference data Xs is obtained by adding Xaf to Xs' (Xs=Xs'+Xaf) in the curve-line mode and the fine-control mode.

The focusing-lens control data Y which corresponds to the reference data Xs in each mode is determined as described above. Here, in a case where the data mode being set has not changed, a point Qa shifts to a point Qaf in the curve-line mode and the fine-control mode, the point Qa shifts to a point Qan in the curve-line mode and the normal mode, a point Qb shifts to a point Qbf in the straight-line mode and the fine-control mode, and the point Qb shifts to a point Qbn in the straight-line mode and the normal mode.

On the other hand, in a case where the data mode being set has changed, the reference data Xs' is corrected to reference data Xs" at step T9a1 or T9b1, using the focusing-lens control data Y at the previous sampling, so as to prevent the focusing-lens control data Y from being changed due to the change-over of the modes. Accordingly, the reference point shifts from the point Qb to a point Qa' in FIG. 8 at step T10a or T10b. Then, the point Qa' shifts to a point Qaf' in the fine-control mode and shifts to a point Qan' in the normal mode.

When the curve mode change-over switch 17 is in the straight-line mode at step T7, the situation of the curved-line mode is also applied thereto. However, when the data mode set previously is different from the data mode set at this time, the reference data Xs' which is the internal data of the CPU 13 is corrected on the basis of the focusing-lens control data Y outputted in the previous sampling at step T9b1, using the following calculation formula. In the following calculation formula, "Fb⁻¹(Y)" is the inverse function of a function "Fb(X)=G*Xs", which is to be used in the straight-line mode.

$$Xs'=Fb^{-1}(Y)$$

Then, the coefficient G for the function for the straight-line mode is read out from the memory 14 at step T11b, and the focusing-lens control data Y is calculated using the following function at step T12b.

$$Y=G*Xs$$

Figure 9:
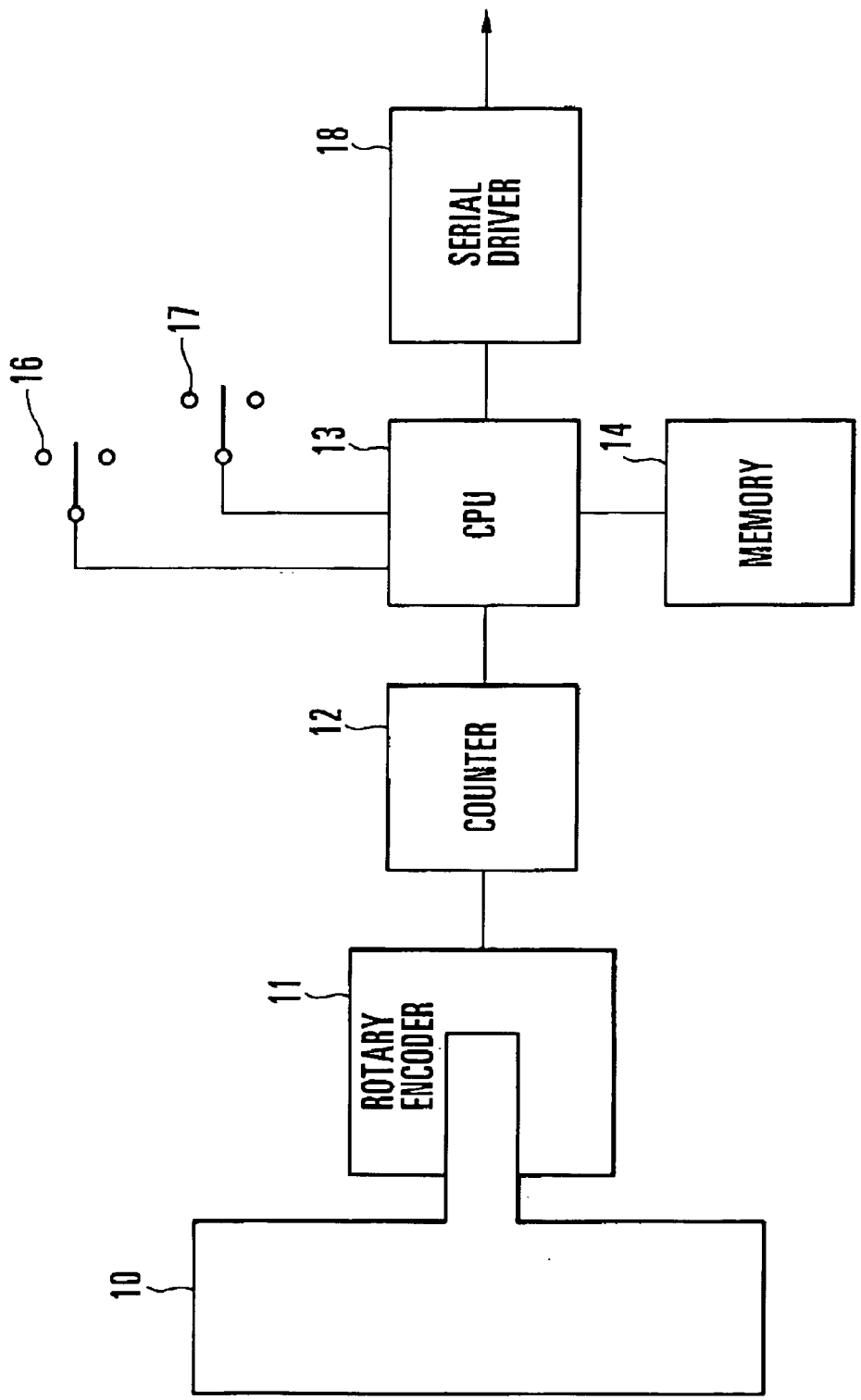
FIG. 9 is a view showing the arrangement of a lens control apparatus according to a third embodiment of the present invention.

FIG. 9 shows a view showing the arrangement of an endless focusing lens control apparatus according to a third embodiment of the present invention. Although in FIG. 1 the D/A converter 15 is interposed between the CPU 13 and a zoom lens in which the focusing lens is operated, the third embodiment is provided with a serial driver 18 for outputting focusing-lens control data Y from the CPU 13 as serial data. The other components of the third embodiment are the same as those shown in FIG. 1 and denoted by the same numerals as those shown in FIG. 1.

Figure 10:
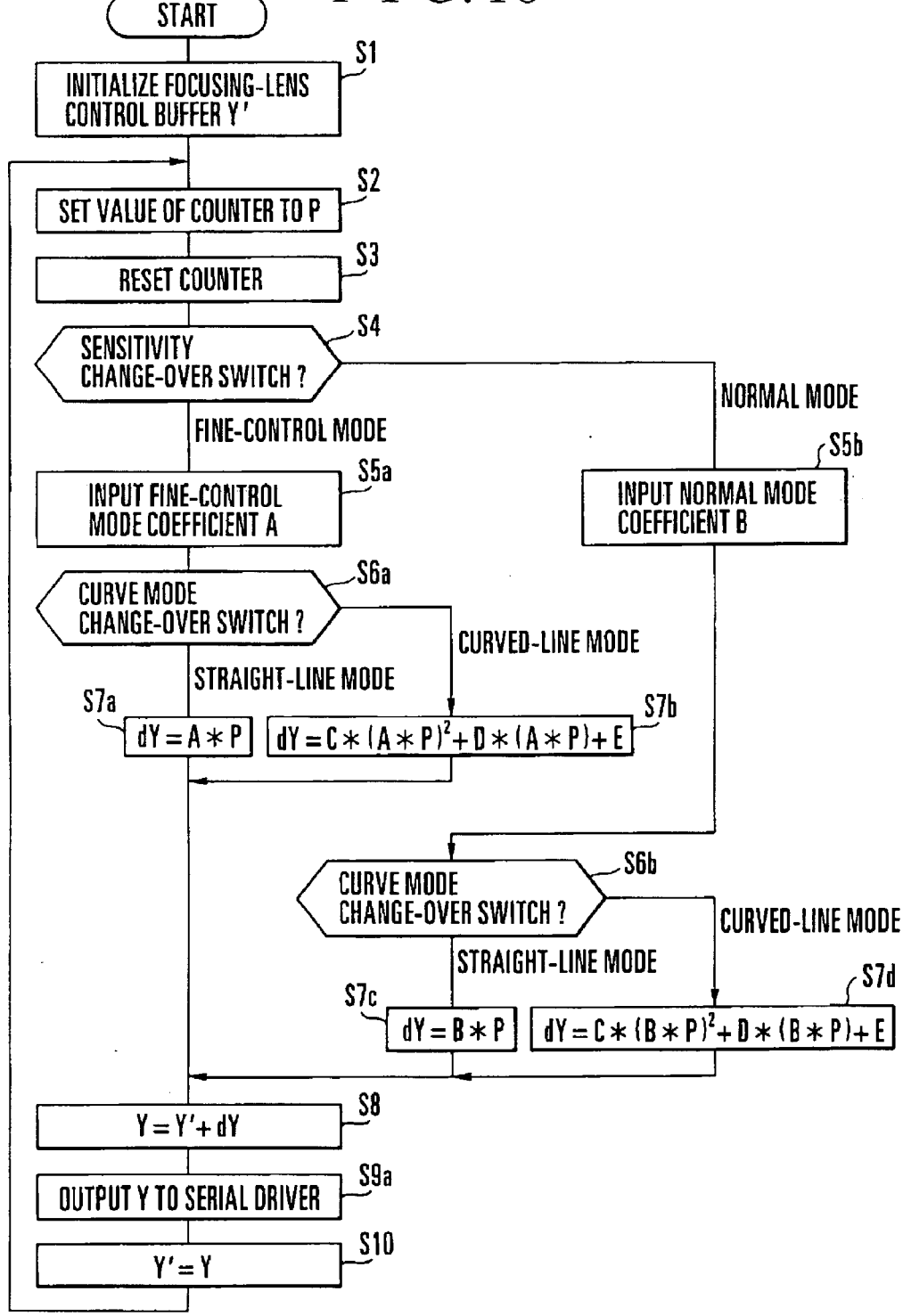
FIG. 10 is a flowchart of the calculation sequence in the third embodiment.

FIG. 10 shows a flowchart of the calculation sequence of the CPU 13 in the third embodiment, wherein step S1 to Step S8 are the same as those in FIG. 2. The focusing-lens control data Y is outputted to the serial driver 18 to thereby transmit the data to the zoom lens, at step S9a. The focusing-lens control data Y is transferred to the focusing-lens control data buffer Y' at step S10, and step S2 to step S10 are repeated again.

FIG. 11 shows a flowchart of the calculation sequence according to a fourth embodiment of the present invention, wherein step T1 to step T12 are the same as those in FIG. 5. Focusing-lens control data Y is outputted to the serial driver 18 at step T13a to thereby transmit the data to the zoom lens. The reference data Xs is transferred to the reference data buffer Xs' at step T14, and step T2 to step T14 are repeated again.

Figure 12:
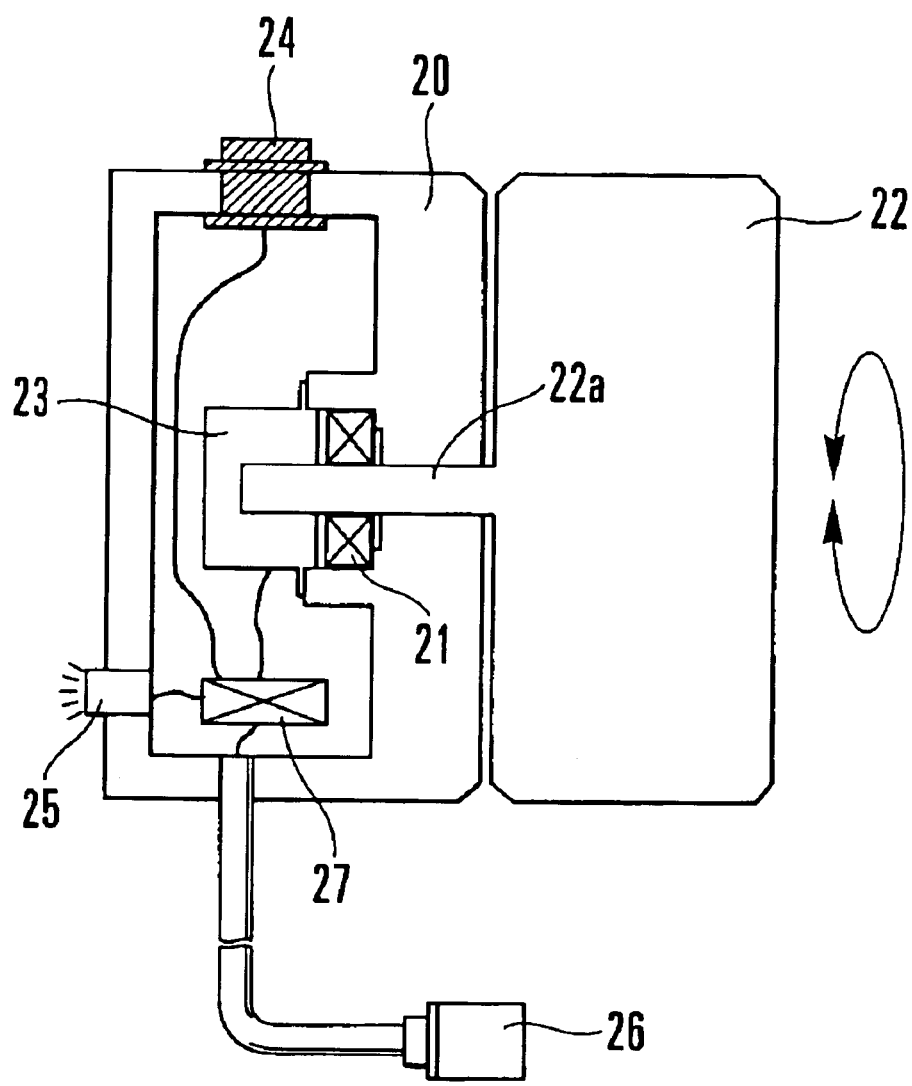
FIG. 12 is a sectional view of a lens control apparatus according to a fifth embodiment of the present invention.

FIG. 12 shows a sectional view of a lens control apparatus according to a fifth embodiment of the present invention. A rotary handle 22 is attached to a focus demand main body 20 through a bearing 21 and a rotary encoder 23 is coupled with a rotating shaft 22a of the rotary handle 22. At arbitrary positions of the focus demand main body 20, there are disposed a mode change-over switch 24 for changing over modes of a sensitivity of operation of the focusing lens relative to the rotational angle of the rotary handle 22 and an LED 25 for indicating the change-over of modes, and a cable connector 26 for connecting the focus demand main body 20 to a lens main body (not shown) is provided. In addition, a control circuit 27 is disposed inside the focus demand main body 20. The outputs of the rotary encoder 23 and the mode change-over switch 24 are connected to the control circuit 27, and the output of the control circuit 27 is connected to the LED 25 and the cable connector 26.

Figure 13:
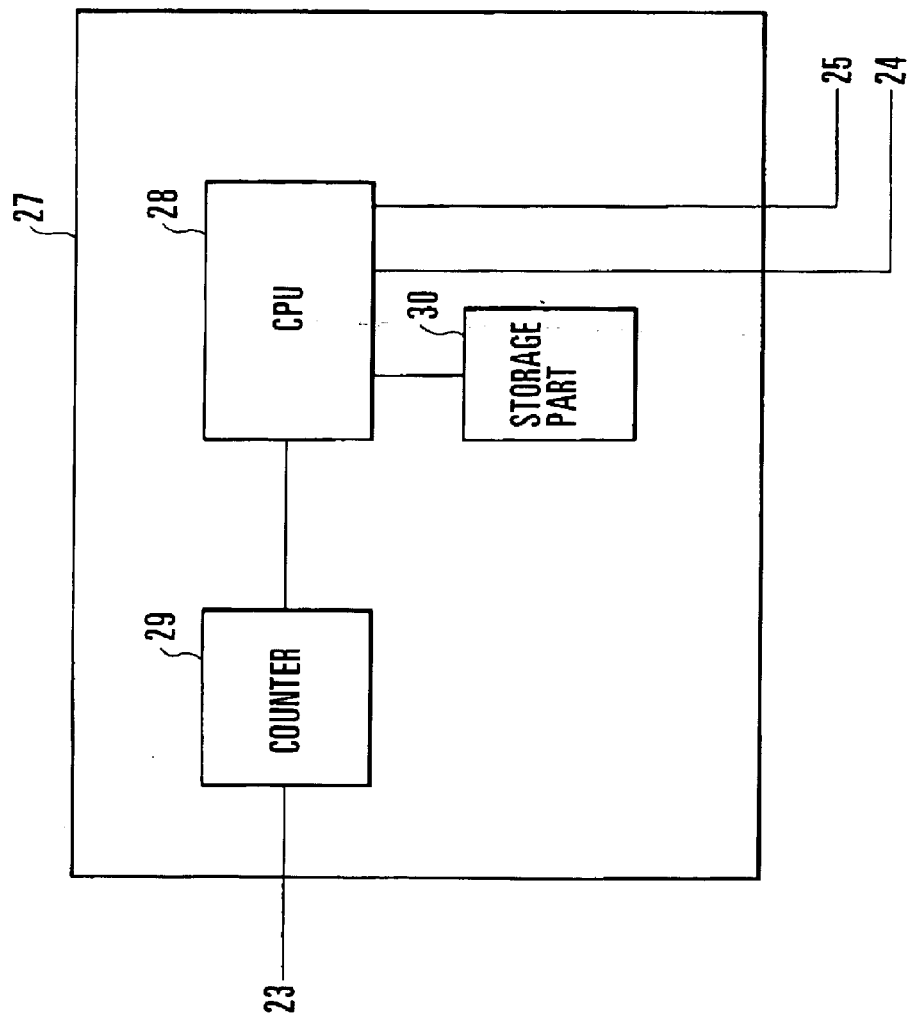
FIG. 13 is a block diagram of a control circuit in the fifth embodiment.

FIG. 13 is a diagram showing the block circuit arrangement of the interior of the control circuit 27. In FIG. 13, the output of a counter 29 is connected to a CPU 28, and the output of the CPU 28 is connected to a storage part 30. Further, the output of the rotary encoder 23 is connected to the counter 29, and the output of the CPU 28 is connected to the mode change-over switch 24 and the LED 25.

Various switches (not shown) permit the rotary encoder 23 to recognize the rotational angle of the rotary handle 22 through the rotating shaft 22a which is rotatably supported by the bearing 21. The rotational angle is detected by the counter 29, which is beforehand initialized. The rotary handle 22 can infinitely rotate because the focus demand main body 20 does not have a means for restricting the rotating range of the rotary handle 22. The control circuit 27 receives a rotational angle signal which is produced by the rotary encoder 23 in accordance with the rotational angle of the rotary handle 22, and supplies the rotational angle signal to the lens main body (not shown) through the cable connector 26, as a position control signal for the focusing lens.

Figure 14:
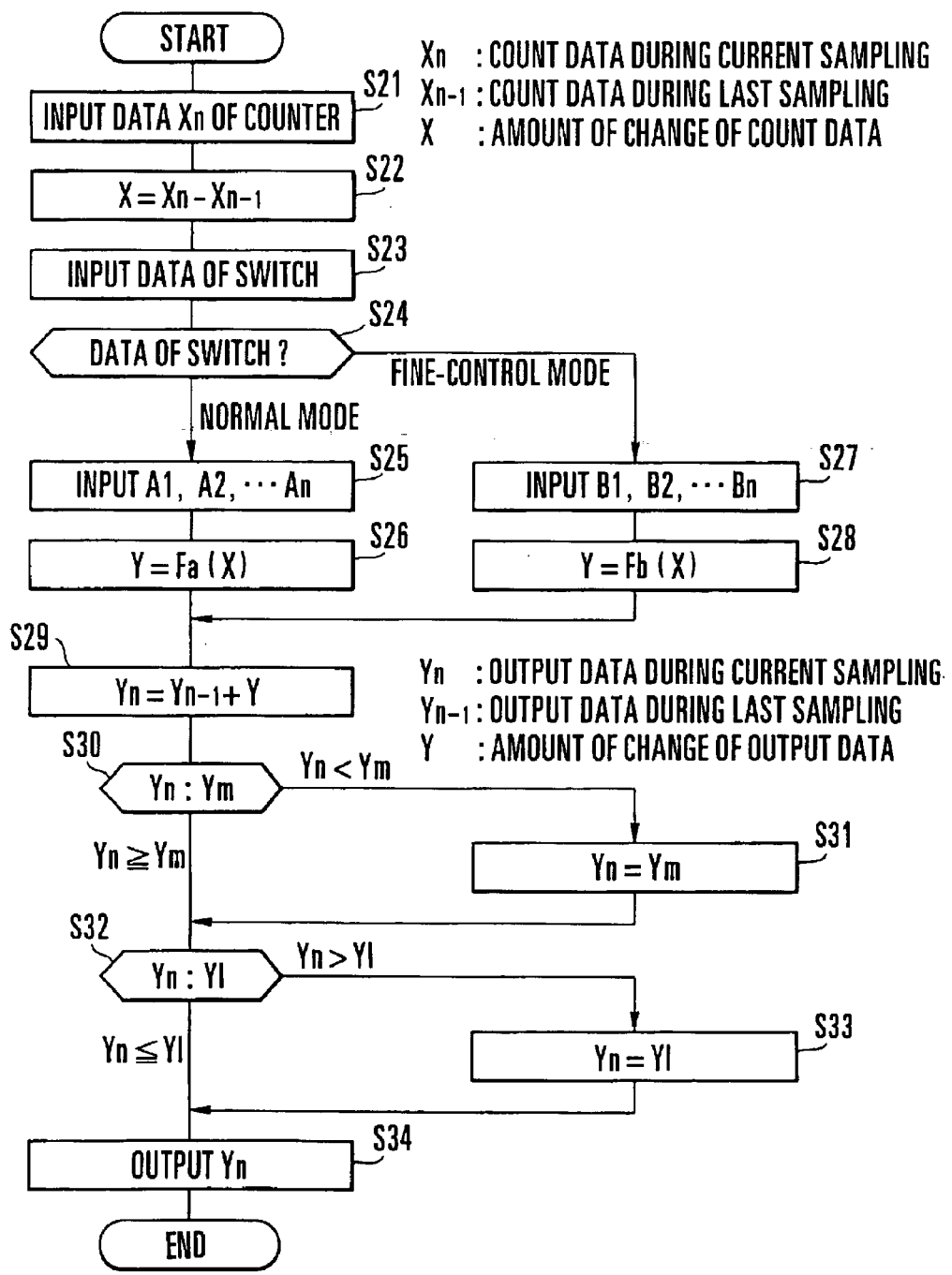
FIG. 14 is a flowchart of the calculation sequence in the fifth embodiment.

FIG. 14 shows a flowchart of the calculation sequence of the CPU 28. The CPU 28 inputs a current counter value Xn from the counter 29 at step S21. The CPU 28 calculates the difference between the current counter value Xn and a counter value Xn-1 which was obtained at the previous sampling, at step S22. A state of the mode change-over switch 24 is inputted at step S23, and the inputted switch data is determined at step S24. When the switch data is off, that is, in the normal mode, the calculation coefficients A1, A2, . . . An for an output signal in the normal mode are inputted from the storage part 30 at step S25, and the amount of change Y of the output signal is obtained using the inputted coefficients at step S26.

On the other hand, when the switch data is on, that is, in the fine-control mode, the calculation coefficients B1, B2, . . . Bn for an output signal in the fine-control mode are inputted from the storage part 30 at step S27, and the amount of change Y of the output signal is obtained using the inputted coefficients at step S28.

Next, output data Yn is obtained at step S29 by adding the output data Yn−1 obtained at the previous sampling to the amount of change Y of the output signal obtained at steps S25–S28. The output data Yn is compared with mode-end limit data Ym at step S30. When Ym>Yn, the output data Yn is made equal to the mode-end limit data Ym (Yn=Ym) at step S31, whereas when Ym≦Yn, the output data Yn is compared with infinitely far end limit data Yl at step S32. When Yl<Yn, the output data Yn is made equal to the infinitely far end limit data Yl (Yn=Yl) at step S33, so that the output data Yn is restricted by the maximum value Yl and the minimum value Ym. On the other hand, when Yl>Yn, the output data Yn is outputted to the zoom lens at step S34.

Thus, the output signal of the rotary encoder 23 is outputted to the zoom lens through the control circuit 27 as described above. If, after the sensitivity of operation of the focusing lens relative to the rotational angle θ is changed from the normal mode to the fine-control mode by turning on the mode change-over switch 24 on the focus demand main body 20 during outputting of the signal for the normal mode, the mode change-over switch 24 is turned off again during outputting of the signal for the fine-control mode to thereby return the fine-control mode to the original normal mode, the relationship between the rotational angle θ and the output voltage V of the rotary encoder 23 varies as shown in FIG. 15.

Figure 15:
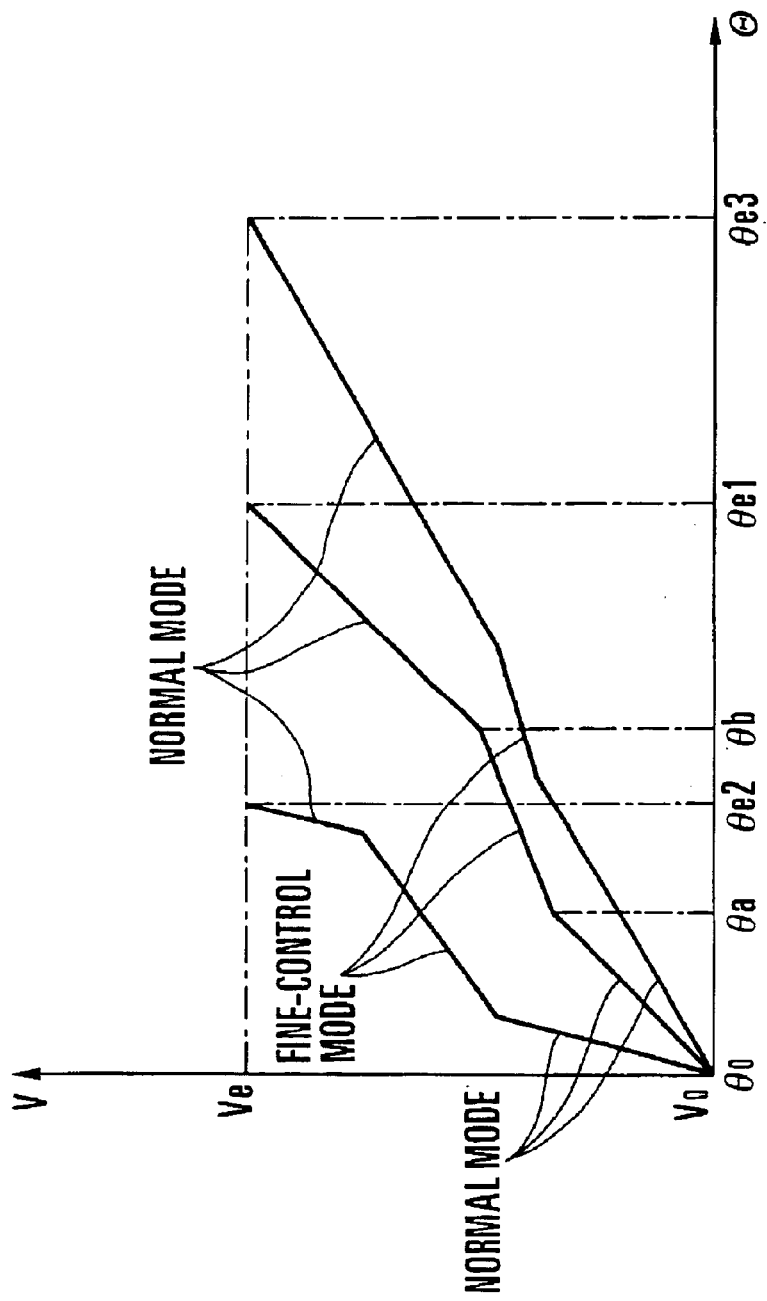
FIG. 15 is a graph showing a relationship between a rotational angle of a handle and an output voltage in the fifth embodiment.

FIG. 15 shows three types of mode change-over combinations. When the rotational angles of the rotary handle 22 at the starting end and terminating end of the focusing lens are represented by θo and θe, respectively, and the rotational angles at the time of the mode change-over are represented by θa and θb, the rotational angle θe changes to angles θe1 to θe3 depending upon the three types of the mode combinations.

Since the restriction to the rotation of the rotary handle 22 is abolished as described above, the rotational angle θe up to the output voltage Ve at the terminating end of the focusing lens can be arbitrarily changed depending upon a prestored mode. As a result, even if the sensitivity of operation of the focusing lens is returned to the original normal mode, the position of the focusing lens is never shifted.

When the mode of the sensitivity of operation of the focusing lens is changed, the LED 25 on the focus demand main body 20 is made to light up or blink in response to the command signal from the control circuit 27, so that the operator can externally confirm the mode change-over. Further, a means for generating sound, a means for partially or totally vibrating the focus demand main body 20, and so on, for example, may be employed, in addition to the display by the LED 25. The turning-off of the mode change-over switch 24 may be controlled on the basis of the number of times the mode change-over switch 24 is opened and closed, or may be controlled by an additional external switch provided separately.

With this arrangement, even if, after obtaining an optimum sensitivity by switching the sensitivity mode of the focusing lens operation at an arbitrary zooming position, the operator returns the switched sensitivity mode to an original sensitivity mode, the position of the focusing lens is not shifted. Further, when two or more types of a rotational angle signal to be switched are prestored in the control circuit 27, the sensitivity of the focusing lens operation can be changed to the modes as many as the number of the types of the rotational angle signal. In this case, a particular mode of sensitivity which is employed to the focusing lens operation can be discriminated by the number of times the mode change-over switch 24 is turned on or by increasing the number of mode change-over switches 24.

Figure 16:
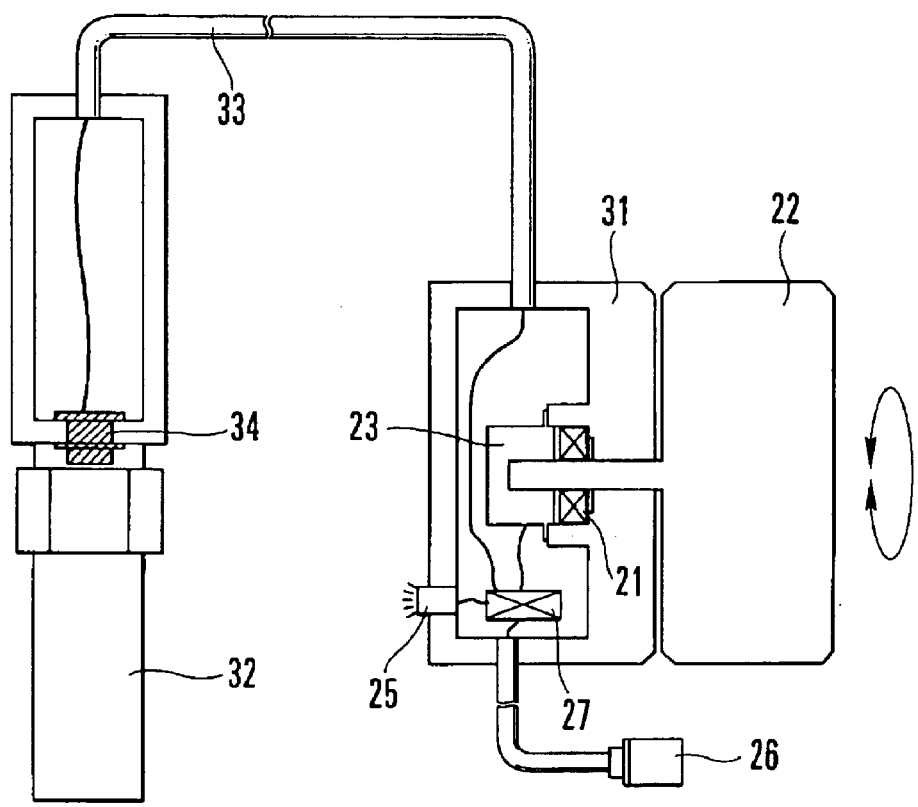
FIG. 16 is a sectional view of a lens control apparatus according to a sixth embodiment of the present invention.

FIG. 16 is a view showing the arrangement of a lens control apparatus according to a sixth embodiment of the present invention. In FIG. 16, a focus demand 31 is connected to a zoom demand 32 through a connecting means 33 such as a connector cable, and a mode change-over switch 34 for selecting the sensitivity mode of a focusing lens operation is mounted on the zoom demand 32. The other components of the sixth embodiment are the same as those of the fifth embodiment, and the same numerals denote the same components.

Figure 17:
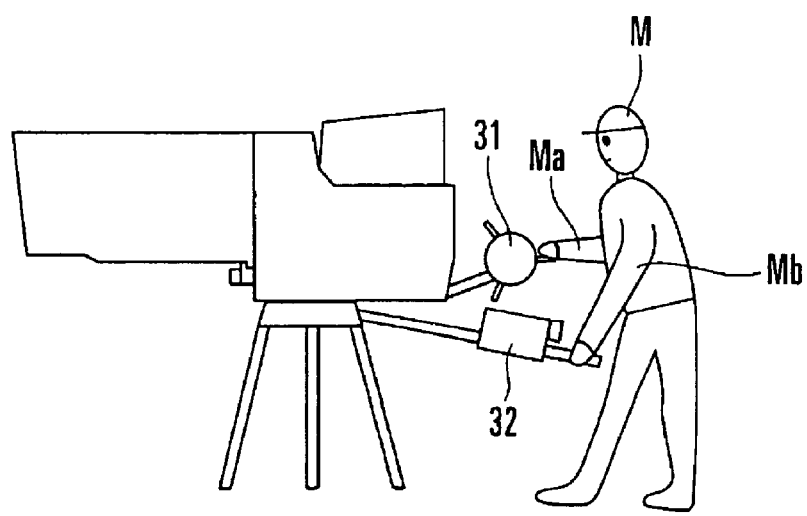
FIG. 17 is a side elevational view of the lens control apparatus in the sixth embodiment when the lens control apparatus is in operation.

FIG. 17 is a view showing the operating state of an ordinary servo type television lens. The cameraman M operates the focus demand 31 with one hand Ma and the zoom demand 32 with the other hand Mb. Then, the cameraman M changes over the sensitivity of a focusing lens operation by the mode change-over switch 34 on the zoom demand 32.

When the cameraman M turns on the mode change-over switch 34 on the zoom demand 32, information on the turning-on of the mode change-over switch 34 is transmitted to the control circuit 27 through the connecting means 33. The control circuit 27 converts the mode of the rotational angle signal produced by the rotary encoder 23 to thereby change over the sensitivity of the focusing lens operation relative to the rotational angle of the rotary handle 22.

Since the cameraman M can switch the mode change-over switch 34 while holding the focus demand 31 and the zoom demand 32 with both the hands Ma and Mb, he or she can change over the sensitivity of the focusing lens operation at any desired position without interrupting the focusing lens operation. Incidentally, an optical transmission through space by an LD or LED or ultrasonic waves may be used as the connecting means 33.

Figure 18:
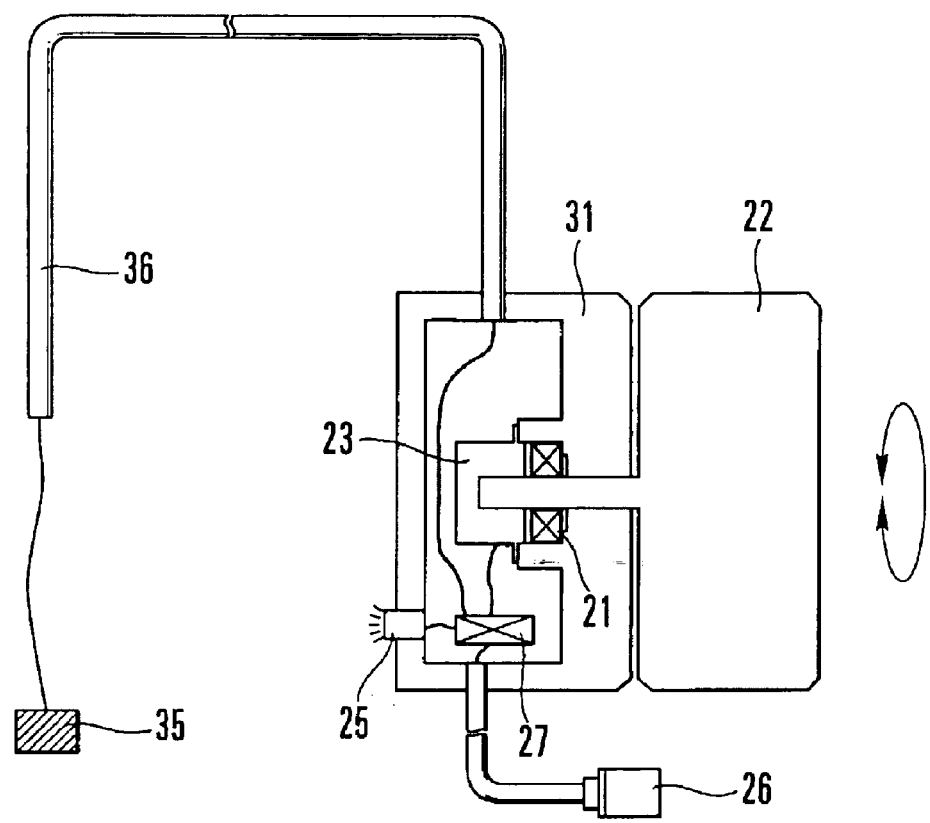
FIG. 18 is a sectional view of a lens control apparatus according to a seventh embodiment of the present invention.

FIG. 18 is a view showing the arrangement of a lens control apparatus according to a seventh embodiment of the present invention, wherein a mode change-over switch 35 for changing over a mode of the sensitivity of a focusing lens operation is arranged as a foot-operating type and connected to the focus demand 31 through a connecting means 36 such as a connector cable.

Figure 19:
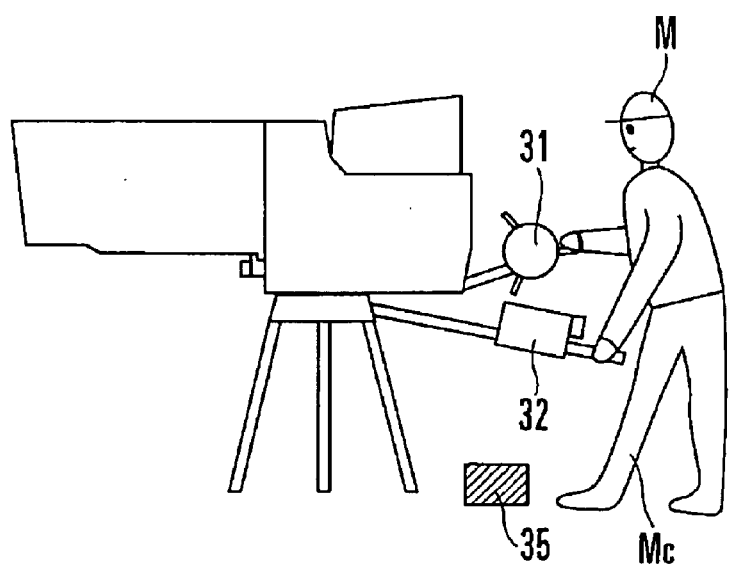
FIG. 19 is a side elevational view of the lens control apparatus in the seventh embodiment when the lens control apparatus is in operation.
Figure 20:
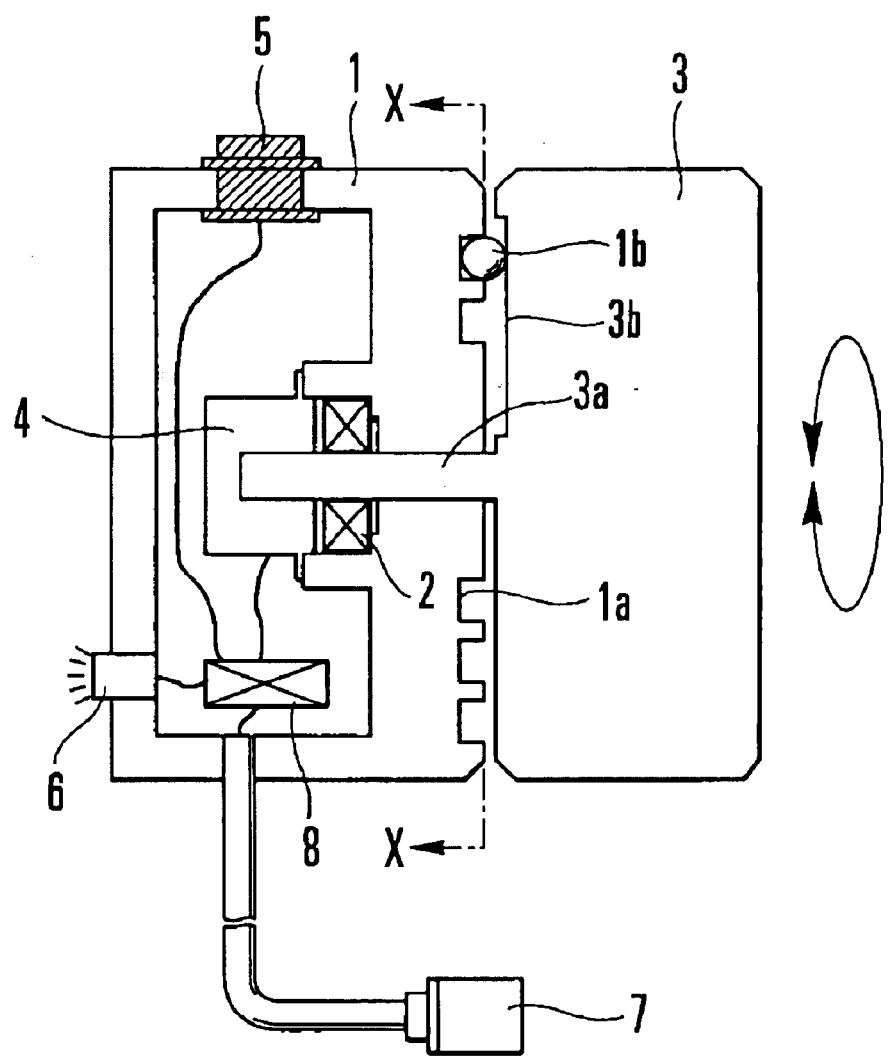
FIG. 20 is a sectional view of a conventional lens control apparatus.
Figure 21:
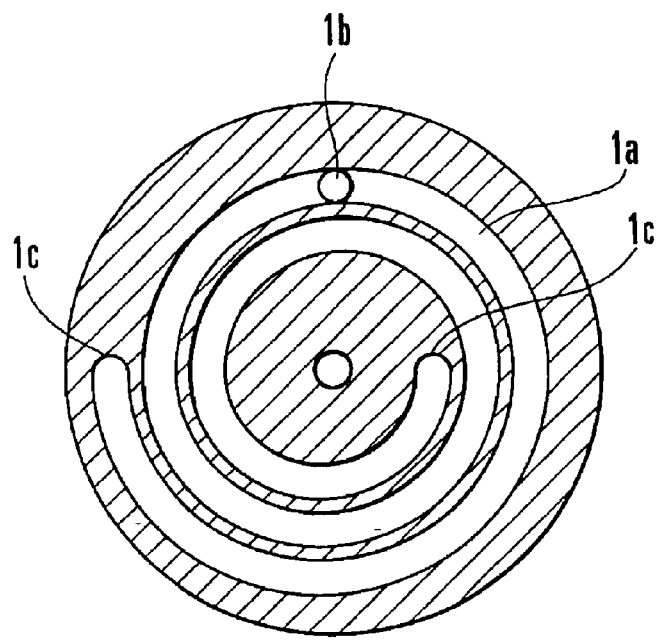
FIG. 21 is a sectional view taken along the line X—X of FIG. 20.
Figure 22:
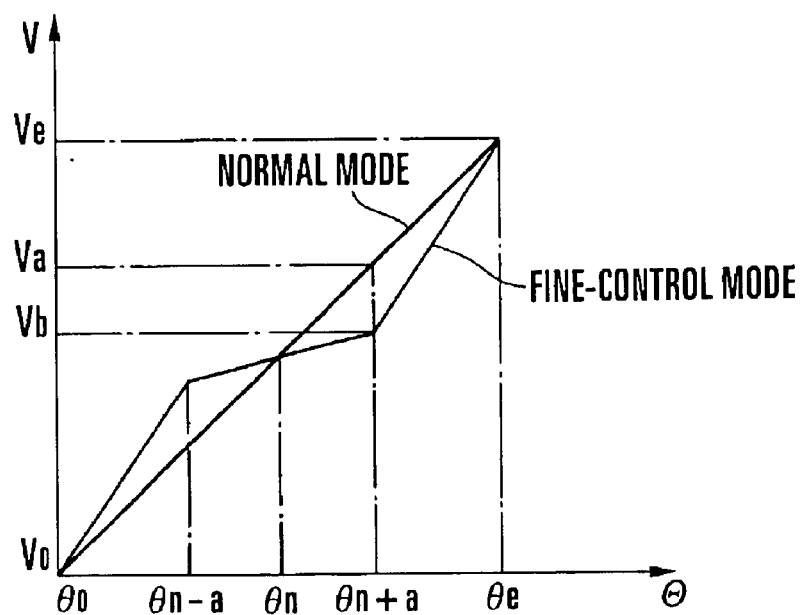
FIG. 22 is a graph showing a relationship between a rotational angle of a handle and an output voltage.
Figure 23:
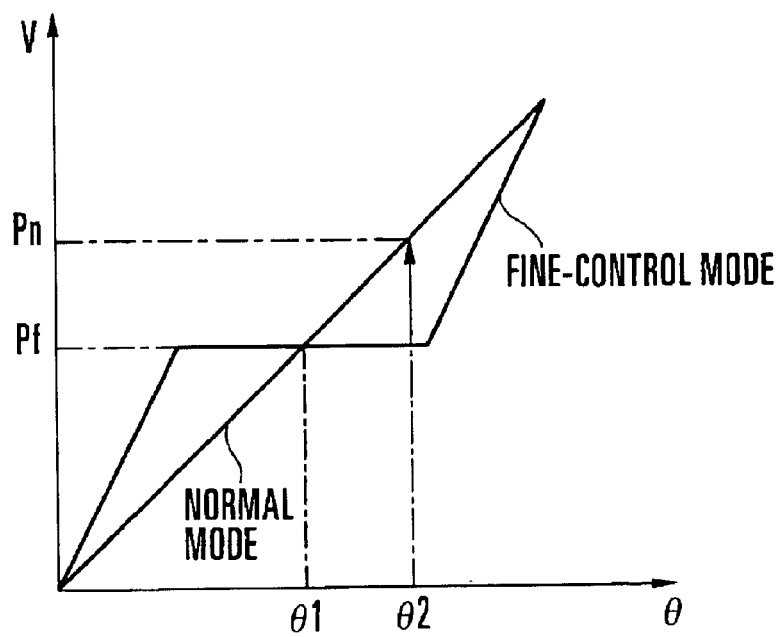
FIG. 23 is a graph showing another relationship between the rotational angle of the handle and the output voltage.

FIG. 19 shows a state where the cameraman M is changing over the sensitivity mode by operating, with his or her foot, the mode change-over switch 35 located at his or her feet. When the cameraman M turns on the mode change-over switch 35 with any one of his or her feet Mc, information on the turning-on of the mode change-over switch 35 is transmitted to the control circuit 27 through the connecting means 36. The control circuit 27 converts the mode of the rotational angle signal produced by the rotary encoder 23, likewise the fifth and sixth embodiments, to thereby change over the sensitivity of the focusing lens operation relative to the rotational angle of the rotary handle 22.

As described above, since the cameraman M can switch the mode change-over switch 35 at a desired zoom position with any one of his or her feet Mc while holding the focus demand 31 and the zoom demand 32 with both the hands Ma and Mb, respectively, he or she can change over the sensitivity of the focusing lens operation without interrupting the focusing and zooming operations.

As described above, a lens control apparatus according to the present invention can optionally change over the sensitivity of a focusing lens operation and returns the sensitivity to its original state again at any optional position by converting the rotational angle of the rotation input means which represents the difference of the positions of the focus demand into the position signal of the focusing lens by the focus control means and calculating the focus converting characteristics of the control means on the basis of the reference data. Further, when a curve mode is switched, the lens control apparatus can change over the relationship between a focus demand position and a focusing-lens control voltage at any optional position. Accordingly, the degree of freedom of the focusing lens operation can be increased.

In addition, since a lens control apparatus according to the present invention abolishes the restriction to the rotational angle at both the ends of the rotation input means in the focus demand, the cameraman can arbitrary change over the sensitivity of the focusing lens operation at any desired position or returns the sensitivity to its original state again. As a result, the degree of freedom of the focusing lens operation can be increased.

What is claimed is:

1. A lens control apparatus, comprising:

a rotary operation member;

conversion means for converting a rotating amount of said rotary operation member into an amount of variation of the control data of a position of a lens; and conversion characteristic changing means for changing a conversion characteristic mode of said conversion means; and wherein when the conversion characteristic mode set at this time is different from the conversion characteristic mode set in the previous sampling, the reference data of the amount of variation of the conversion characteristic mode set at this time is corrected based on the control data of the conversion characteristic mode set in the previous sampling.

2. A lens control apparatus according to claim 1, wherein said lens is a focusing lens constituting a camera lens.

3. A television camera provided with a lens control apparatus in accordance with claim 1.

4. A television camera provided with a lens control apparatus in accordance with claim 2.

\* \* \* \* \*

UNITED STATES PATENT AND TRADEMARK OFFICE
CERTIFICATE OF CORRECTION

PATENT NO.    : 6,822,686 B1  
DATED         : November 23, 2004  
INVENTOR(S)   : Kenichi Kubo et al.

It is certified that error appears in the above-identified patent and that said Letters Patent is hereby corrected as shown below:

<u>Column 6,</u>  
Line 15, delete "TS$b$" and insert -- T5$b$ --.

Signed and Sealed this

Twenty-eighth Day of March, 2006

JON W. DUDAS  
*Director of the United States Patent and Trademark Office*